Feb. 28, 1950

LE ROY CLARDY 2,498,941

CLOUD POINT INDICATOR

Filed March 23, 1948

INVENTOR.
LeRoy Clardy
BY
Roy S. Story
ATTORNEY

Patented Feb. 28, 1950

2,498,941

UNITED STATES PATENT OFFICE 2,498,941

CLOUD POINT INDICATOR

Le Roy Clardy, Chicago, Ill., assignor to Swift & Company, Chicago, Ill., a corporation of Illinois Application March 23, 1948, Serial No. 16,442

2 Claims. (Cl. 177—311)

This invention relates to an analytical control apparatus and particularly to an apparatus for indicating photoelectrically the cloud point of a fat.

The cloud point of a fat is arbitrarily defined as that temperature at which a definite amount of crystallization has taken place when the fat has been cooled under definite conditions of method and rate. It is known that this temperature is related to the plasticity of the chilled fat in its final processed condition, which plasticity in turn is directly related to the baking qualities of the fat. Furthermore, it is known that the best point of correlation is not the temperature at which an initial clouding has occurred but rather after an appreciable amount of crystallization has taken place.

In general cloud points of fats vary between 20° C. and 40° C. Lard usually has a cloud point of about 22° C. while vegetable shortenings have cloud points between 22° C. and 33° C. It is apparent, of course, that the composition of these fats differs greatly, and therefore their relative hardness is different and consequently the temperatures at which a specific degree of cloudiness due to crystallization is obtained also vary considerably.

The present invention provides an apparatus for accurately determing the relative hardness or plasticity of fats based on the temperature at which a specific degree of crystallization is reached and which is designated as the cloud point of a fat, and lends itself as a rapid control means in the manufacture of shortenings.

One of the objects of the present invention, therefore, is to provide an improved apparatus for indicating photoelectrically the cloud point of a fat.

Another object of the present invention is to provide an improved apparatus for accurately indicating photoelectrically the cloud point of a fat within a narrow cloud point specification range.

Another object of the present invention is to provide means for photoelectrically indicating the cloud point of a fat essentially independent of the initial cloudiness of the oil.

Another object of the present invention is to provide an improved apparatus for accurately measuring the intensity of a light beam which has penetrated a sample of fat and which is a measure of the cloudiness of the fat.

Another object of the present invention is to provide an improved apparatus for indicating photoelectrically the cloud point of a fat in which an alarm is sounded when a predetermined degree of crystallization has taken place.

Other objects of the present invention will be apparent from the description and claims which follow.

Figure 1:
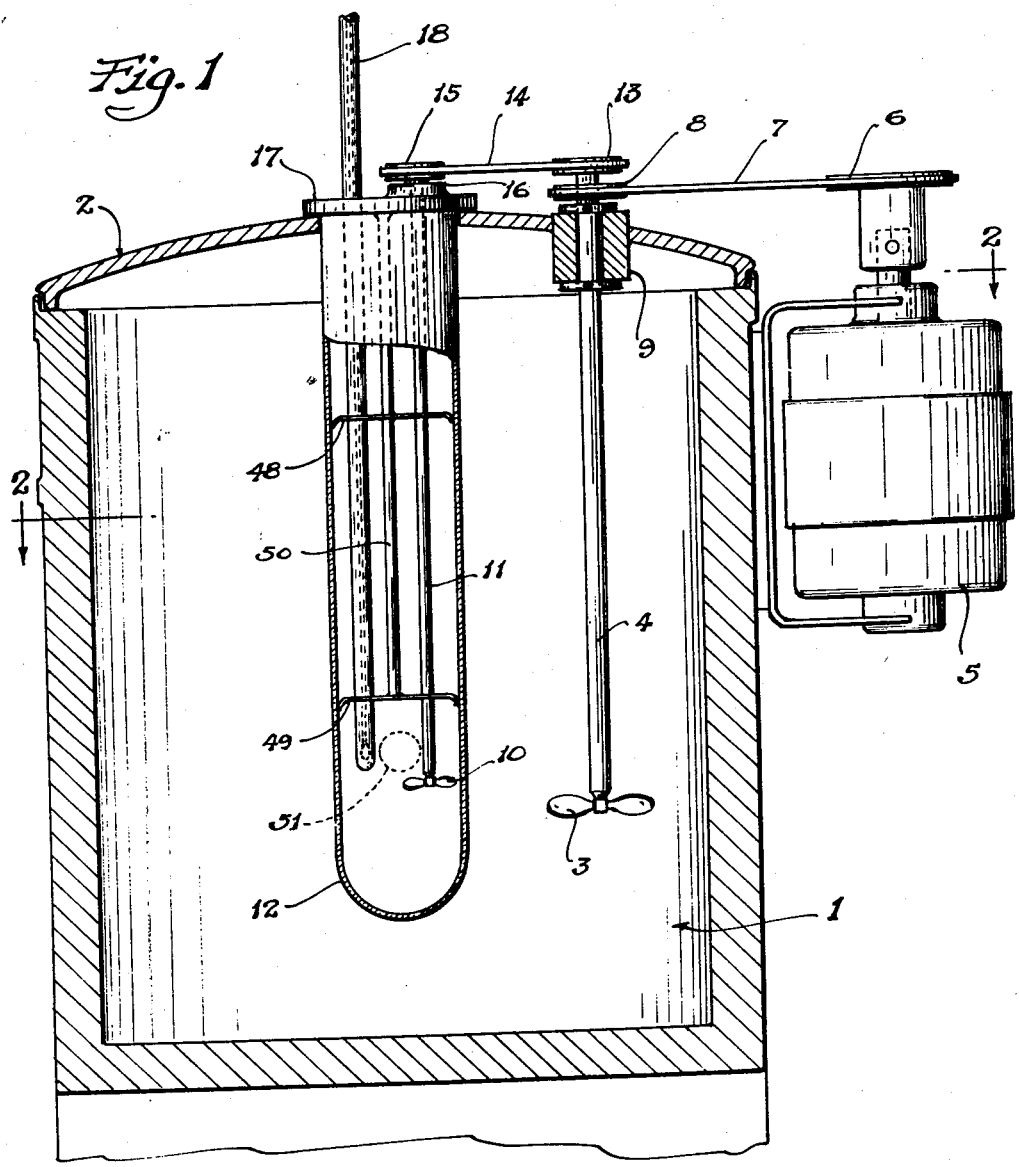
Figure 1 is a vertical section of a device in accordance with the present invention with certain parts omitted.
Figure 2:
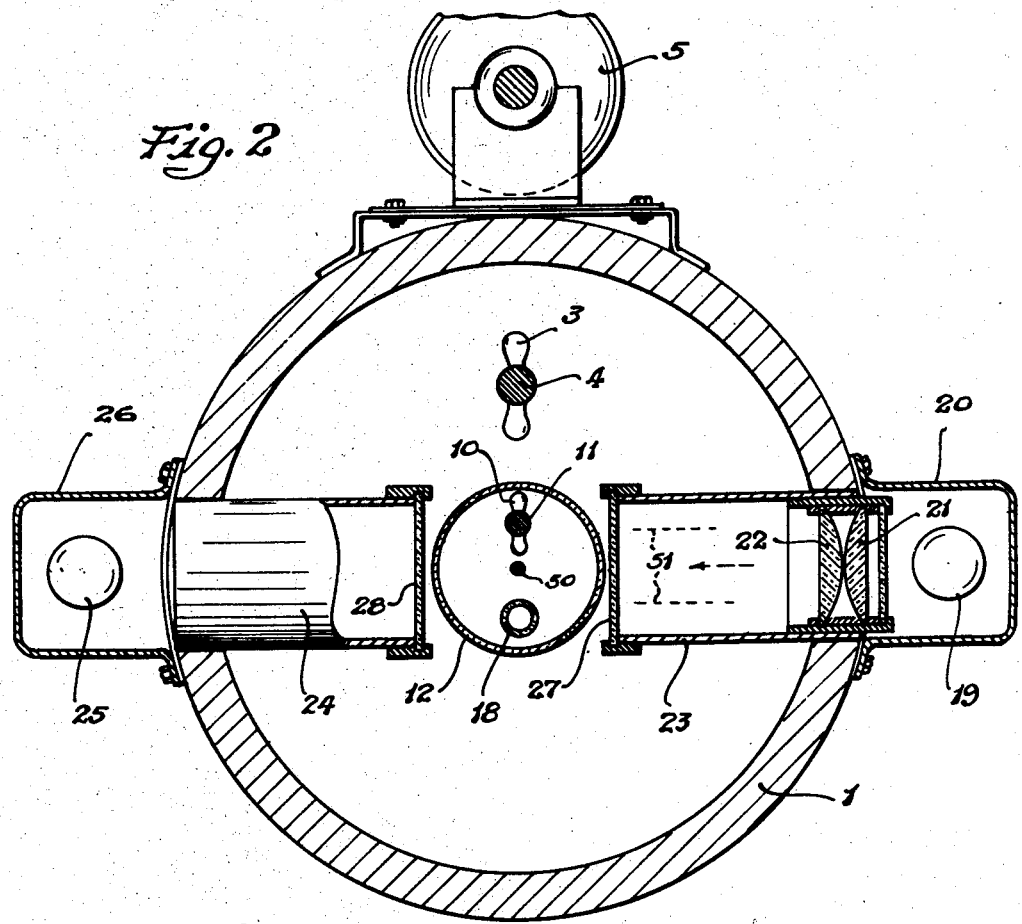
Figure 2 is a sectional view taken substantially on line 2—2 of Figure 1.

Referring to Figures 1 and 2 of the drawings, reference numeral 1 indicates a cooling bath provided with removable cover 2. Agitator 3 is provided for stirring the liquid in the bath and is mounted on shaft 4 which is driven by motor 5 through the medium of pulley 6, belt 7, and pulley 8. Shaft 4 is mounted in a suitable bearing 9. Agitator 10 is provided for stirring a sample of fat and is mounted on shaft 11 disposed within transparent tube 12, which agitator 10 is driven by motor 5 through the medium of pulley 13, belt 14, and pulley 15. Shaft 11 is mounted in a suitable bearing 16 located in cover 17 of tube 12. Thermometer 18 is disposed within tube 12 through an opening in cover 17. Thermometer 18 and shaft 11 are positioned by holes in positioning platforms 48 and 49 attached to cover 17 by supporting bar 50. Tube 12 is removable from the cooling bath 1 through an opening in cover 2. The vessel 1 may be provided with a suitable overflow pipe not shown.

Lamp 19, located within housing 20 mounted adjacent to one side of bath 1, is adapted by means of condensing lenses 21 and 22 to pass a beam of light 51 through tubular members 23 and 24 to phototube 25 located within housing 26 mounted on the opposite side of vessel 1 from lamp 19. Members 23 and 24 are closed at their ends adjacent to transparent tube 12 by plane glass surfaces 27 and 28. It is to be noted that condensing lenses 21 and 22 and members 23 and 24 serve to direct and confine the beam of light so that its focal point is directly upon phototube 25. When a sample of fat is melted and placed within tube 12, light is admitted to tube 12 only from light source 19, and, depending on the light transmitting properties of the mixture in the tube, varying amounts of light pass to phototube 25.

Figure 3:
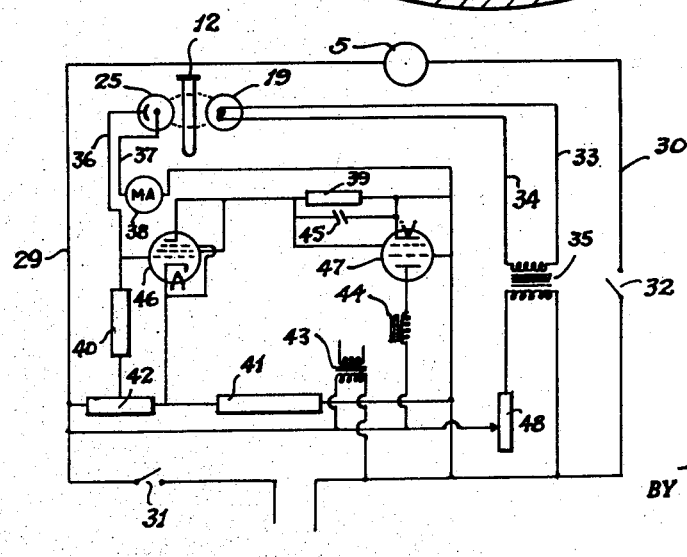
Figure 3 is a diagrammatic view illustrating more particularly the circuit control means for the device illustrated in Figures 1 and 2.

In Figure 3 of the drawings, a suitable source of power (not shown) supplies electric energy to motor 5 through wires 29 and 30 provided with switches 31 and 32. Wires 33 and 34 connected to transformer 35 carry electric energy to lamp 19. Wires 36 and 37 are connected to phototube 25. The above-mentioned photoelectric circuit also includes microammeter 38; fixed resistors 39, 40, and 41; potentiometer 42; transformer 43; relay 44; condenser 45; vacuum tube 46, which may be and preferably is a triple-grid amplifier; and a grid control rectifier 47, which may be and preferably is of the gas-tetrode type, such as a thyratron.

Resistor 39 and condenser 45 form a grid bias control circuit for the tube 47. Transformer 43 supplies voltage to tubes 46 and 47. Potentiometer 48 varies the voltage across the lamp filament by means of transformer 35, and therefore varies the intensity of the lamp 19. Potentiometer 42 regulates the initial grid bias of tube 46.

It will be understood that phototube 25 has the property of generating an electric current proportional to the amount of light flux incident upon its sensitive surface.

When the light from lamp 19 strikes phototube 25, a current flows through the circuit, causing a voltage to appear across resistor 40 so as to make the grid of tube 46 more positive. The initial negative charge of the grid of tube 46 is determined by the position of the slider on potentiometer 42. It will be noted that potentiometer 42 and resister 41 form a voltage dividing circuit so that during the half cycle when the plate of tube 46 is positive, the grid of tube 46 will be negative by an amount determined by the position of the slider on potentiometer 42. The voltage caused by the flow of current through the phototube 25 and through resister 40 adds algebraically to the negative charge on the grid of tube 45. Therefore, the amount of current that will flow through tube 46 on the half cycle when the plate of this tube is positive with respect to its cathode, depends on the charge on the grid, which in turn depends upon the amount of light reaching the phototube 25.

Tubes 46 and 47 are operated in a "back-to-back" position. Since these tubes only permit current to flow when the plates are positive, it will be seen that they operate on different halves of the A. C. cycle, and while one tube is conducting, the other tube is inoperative.

The current of tube 46 flows through resister 39, causing a voltage to appear across resister 39 in such a manner as to make the grid of tube 47 less positive for increasing current through tube 46. Thus by increasing light on phototube 25, the negative charge on the grid of tube 47 is increased. However, tube 47 does not conduct during the period that the voltage appears across resister 39. Therefore, condenser 45 operates to hold this voltage until the next half cycle when tube 47 is operative. On the half cycle when the plate of tube 47 is positive, the tube will conduct or not, depending upon the charge on its grid. If the amount of light striking phototube 25 is above a certain value, the grid of tube 47 will be negative enough to prevent the flow of current through this tube. Conversely, if the light reaching phototube 25 decreases below a certain value, the grid of tube 47 will be more positive and will allow current to flow through the tube.

It will be apparent, therefore, that thyratron tube 47 acts as a trigger, and, when the light level drops below a certain value, the current through this tube is established and flows through buzzer 44. As tube 47 is connected to a source of alternating current and allows current flow in one direction only, current through the winding of buzzer 44 is intermittent, and, consequently, buzzer 44 is caused to sound. This is the signal that the cloud point has been reached.

In the operation of the device of the present invention using lard as a specific fat, the cloud point of which it is desired to determine, in order to establish a definite cooling rate of the fat, the temperature of the water in the cooling bath 1 is adjusted to about 18° C. to 20° C. or from two to four degrees below the expected cloud point of the lard—it having been previously determined experimentally that lard usually has a cloud point of around 22° C. The lard is melted and the lard oil is poured into tube 12. The light intensity of lamp 19 is adjusted to approximately full scale on microammeter 38 by adjustment of potentiometer 48. The control circuit is adjusted by potentiometer 42 so that the buzzer sounds when the light transmitted through tube 12 containing the lard oil is around 25 per cent of the total initial light intensity, or approximately ¼ of the initial scale reading of the microammeter 38—it having been determined experimentally that using 25 per cent transmission of light results in a desirable and easily reproducible cloud point. Agitator 10 in tube 12 is set in motion to constantly stir the fat. This agitation in conjunction with the cooling liquid in bath 1 serves to provide a definite cooling rate of the fat. The temperature of the fat drops rapidly and crystallization begins. When an appreciable amount of crystallization occurs and the intensity of the light beam has been sufficiently reduced because of the presence of the crystals, the current flows through the thyratron tube and through the relay, causing the buzzer to sound. The temperature of the lard at which this occurs is recorded as the cloud point. By following the procedure outlined above employing the apparatus of the present invention, it has been found that an accuracy of around 0.1° C. can be obtained on identical portions of the same fat sample.

It is apparent that because the light intensity can be varied, the device of the present invention functions practically independently of any initial cloudiness of the oil being tested. By proper adjustment of the intensity of the light at the beginning of the test, adequate compensation is thereby provided for any initial cloudiness or darkness of the oil.

From the foregoing, it will be seen that the apparatus of the present invention provides an accurate means for determining the cloud point of a sample of fat in which a source of radiant energy is passed through the melted fat and is directed upon a phototube. The intensity of the light reaching the phototube at any instant as compared with the intensity at the beginning of the test is a measure of the cloudiness of the fat, and, since the current from the phototube is directly proportional to the intensity of the light, the amount of crystallization is related to the reading on the microammeter scale. Finally, it will be observed that by connecting an amplifier and a thyratron tube into the photoelectric circuit, the weak signal received by the amplifier from the phototube when the light level drops to a certain level is amplified so as to cause the thyratron to break down and allow current to flow therethrough into a relay to cause the relay to buzz, thus audibly indicating when the cloud point of the fat sample has been reached.

Obviously, many modifications and variations

I claim:

1. In a device for indicating the cloud point of a fat, the combination comprising: a cylindrical vessel adapted to contain a cooling liquid, a housing mounted on one side of said vessel, a light source in said housing and including means for directing a beam of light across said vessel, a second housing mounted on the opposite side of said vessel, a phototube mounted in said second-mentioned housing and arranged to receive said beam of light, a transparent tube adapted to contain a liquefied fat extending vertically downwardly into the interior of said vessel and interrupting said light beam, a stirrer positioned within said transparent tube for agitating said liquefied fat, a vacuum tube amplifier associated with said phototube for amplifying the electrical impulses received from said phototube, a thyratron tube connected to said amplifier, and buzzer mechanism associated with said thyratron and being operative by the flow of current through said thyratron to sound an audible signal upon a predetermined change in the light transmission characteristics of the liquefied fat.

2. In a device for indicating the cloud point of a fat, the combination comprising: a cylindrical vessel adapted to contain a cooling liquid, a housing mounted exteriorly of said vessel, a lamp in said housing, a second housing mounted exteriorly of said vessel and being oppositely disposed with respect to said first-mentioned housing, a phototube mounted in said second-mentioned housing, tubular members including a pair of condensing lenses disposed interiorly of said vessel and mounted adjacent to said housings constructed and arranged so as to direct and confine the beam of light emanating from said lamp so that its focal point strikes said phototube, a transparent tube adapted to contain a liquefied fat extending vertically downwardly into the interior of said vessel and being disposed between said tubular members, a stirrer positioned within said transparent tube, means for rotating said stirrer for agitating said liquefied fat, a thermometer suspended in said liquefied fat to measure the temperature thereof, a vacuum tube amplifier associated with said phototube for amplifying the electrical impulses received from said phototube, a thyratron tube connected to said amplifier, and buzzer mechanism associated with said thyratron, said thyratron serving as an electronic switch and being operative to allow the current to flow therethrough and into said buzzer to cause said buzzer to sound an alarm when the light transmitted to said phototube falls to a predetermined value.

LE ROY CLARDY.

REFERENCES CITED

The following references are of record in the file of this patent:

UNITED STATES PATENTS

| Number | Name | Date |
| --- | --- | --- |
| 2,278,920 | Evans et al. | Apr. 7, 1942 |
| 2,295,366 | Stout | Sept. 8, 1942 |
| 2,423,687 | Davis | July 8, 1947 |
| 2,446,885 | Rollefson | Aug. 10, 1948 |